US005859377A

United States Patent [19]

Mackey et al.

[11] Patent Number: 5,859,377

[45] Date of Patent: Jan. 12, 1999

[54] PERSONALIZED MOLDED FINGERPRINTED PICK AND PICK HOLDER AND PROCESS

[76] Inventors: Richard J. Mackey, 2036 Grosvenor Dr., Moon Township, Pa. 15108; Darryl S. Griffing, P.O. Box 224, Canton, Conn. 06019

[21] Appl. No.: 706,606

[22] Filed: Sep. 5, 1996

[51] Int. Cl.[6] .................................................. G01D 3/16

[52] U.S. Cl. .................................................. 84/322

[58] Field of Search .................................. 84/322; D17/20

[56] References Cited

U.S. PATENT DOCUMENTS

| | | | |
|---|---|---|---|
| 4,879,940 | 11/1989 | Pereira | 84/322 |
| 4,993,302 | 2/1991 | Jonathon | 84/322 |
| 5,648,622 | 7/1997 | Storey | 84/322 |

*Primary Examiner*—William M. Shoop, Jr.
*Assistant Examiner*—Shih-yung Hsiuh
*Attorney, Agent, or Firm*—Bachman & LaPointe, P.C.

[57] ABSTRACT

A pick for a stringed musical instrument includes a first and a second surface. At least one of the first and the second surface has a replica of a fingertip impression for achieving enhanced pick gripability. A process for forming a stringed musical instrument pick includes the steps of forming the pick having first and second gripping surfaces. At least one of the first and second gripping surfaces has a replica of a fingertip impression therein for enhancing gripability of the pick. A pick holder for use in holding a standard pick used for playing a stringed musical instrument is also disclosed. The pick holder includes a first side and a second side connected with and spaced from the first side. A pocket is formed between the first and second sides and includes means for engaging the pick. At least one of the first surface of the first side and the second surface of the second side includes a replica of a fingertip impression for achieving enhanced pick gripability. A process for forming the holder is also disclosed.

27 Claims, 4 Drawing Sheets

PERSONALIZED MOLDED FINGERPRINTED PICK AND PICK HOLDER AND PROCESS

BACKGROUND OF THE INVENTION

This invention is directed to the playing of musical instruments, and more particularly, to an improved pick and/or pick holder for use in playing stringed musical instruments.

While playing musical instruments, musicians frequently exert large amounts of energy and as a result their hands may become oily and sweaty. Because of such oily and sweaty hands, traditional flat picks which are used to play stringed musical instruments may become difficult to hold onto while playing. This is true particularly when the instrument's strings are of a heavier gauge. While attempts in the prior art have been made to improve the gripability of picks, none have been particularly successful.

In the plectrum or pick prior art, those persons skilled in the art are aware that flat shaped picks may be enhanced for gripping by providing the surfaces thereof with a roughened finish. Accordingly, picks may be molded or otherwise formed with front and back surfaces including ridges or otherwise roughened textures. While such grip-enhanced surfaces may improve gripability to some degree, users of these picks still experience the pitfalls of non grip-enhanced picks. That is, since these picks having ridges or otherwise roughened surfaces are not personalized to the pick user, the picks still tend to allow gripability problems.

Another design for increasing the gripability of picks is to form the picks with recesses on one or both sides thereof, in the area of the pick adapted to be grasped by the musicians fingertips. Frequently, these recesses are in the shape of semicircular indents having a constant depth. While these indents improve gripability to some degree, overall grip enhancement is still insufficient since such indents do not conform to all of the various shapes of fingertips among stringed instrument musicians. That is, since the size and shape of fingertips vary from person to person, the semicircular or similarly shaped indents on guitar picks known in the prior art are not sufficient to meet the requirements of every musician. For some musicians the indent may be too large and for others the indent too small. Even if a variety of indent sizes are provided, the shape of the indent still fails to conform to the shape of the players fingertips. The shape is as important as the size since an indent which does not conform to the fingertip in shape will not sufficiently provide enhanced gripability. Accordingly, these prior art, grip-enhanced picks are not sufficient to meet the needs of today's hard working musicians.

U.S. Pat. No. 5,509,341 discloses a thumb pick for use on the thumb of a musician. This pick includes a thumb engaging means for securely coupling the pick to the thumb, a pick portion for engaging a string and an intermediate portion. While the secure attachment of this pick to the thumb may enhance gripability, the pick does not personally conform to the musician's thumb and the pick becomes attached to the thumb on a more permanent basis than desired for other fingers. Accordingly, with this attachment, freedom is lost in that the pick may not easily be changed, temporarily put-down, or moved in position as many musicians desired, for example, to acquire a different gauge pick or to fingerpick.

Materials and objects formed from these materials which may be formed or conformed in various manners under heated or otherwise chemically activated states are also known in the art. However, none of these materials are known to have been used for forming grip-enhanced stringed instrument picks. Some of these materials and objects formed thereby are discussed in the following prior art patents. The materials and patents fall generally into two categories, (1) moisture-hardening materials and (2) thermal hardening/softening materials.

One moisture-hardening material is shown in U.S. Pat. No. 5,319,050 to Kimura et al. disclosing a room temperature fast-curing composition. The composition is a condensation-curing type which comprises diorganopolysiloxane or polyoxyalkylene blocked by hydrolyzable silyl group at both terminal ends of its molecular chain as a base polymer, in which a carbonyl group-containing organic compound and an amino group-containing organic compound, are compounded. This composition is capable of forming water through dehydration condensation between carbonyl and amino groups, simultaneously with curing of the composition by moisture in air. The formation of water offers marked improvements in the fast-curing property of the material and also in the depth curing property of the material.

Another moisture-hardening composition is disclosed in U.S. Pat. No. 5,288,797 to Khalil et al. Accordingly, a one-part moisture curable polyurethane adhesive composition comprises a blend of polyurethane prepolymers and one or more additives which unexpectedly improve the sag resistance and mechanical properties of the formulation. The final adhesive composition retains good stability in the absence of moisture for an extended period between manufacture and application of the adhesive, and has a relatively rapid and consistent cure rate in the presence of atmospheric moisture. The final cured composition exhibits good mechanical properties and generally is unaffected by ambient application and cure conditions.

A thermal-softening composition is disclosed in U.S. Pat. No. 5,431,563 to Huybrechts for forming a remoldable dental article. The article, due to the composition disclosed therein, is capable of daily reheating and remolding for repeated daily customization to the shape of the user. The composition sets at 37° C. and is moldable between 50°–95° C. Another thermal-hardening composition is shown in U.S. Pat. No. 5,321,054 to Pasini. This patent discloses a composition which is controlled and program hardened to record dental impressions and which is free of any gel-forming components, peroxide-based catalysts, aromatic compounds and incompatible plasticizers.

In accordance with the known prior art such as the above references, there exists no disclosure of a stringed musical instrument pick or plectrum formed from a moisture or thermal hardening/softening composition so as to form a stringed musical instrument pick having a grip personalized to the fingertips of the musician.

There exists a need, therefore, for a stringed musical instrument pick having the fingertip impressions of the stringed instrument musician formed into the material of the pick for enhancing and personalizing the grip thereof.

SUMMARY OF THE INVENTION

The primary object of the invention is to provide a stringed musical instrument pick having formed therein a replica of a musician's fingertip impression.

Another object of this invention is to provide a stringed musical instrument pick formed from a material which is conformable at room temperature or at an elevated temperature so that replicas of fingertip impressions can be formed thereon for enhancing the gripability of the pick.

And still another object of this invention is to provide a guitar pick having two sides wherein the surface of each side has at least one replica of a musician's fingertip impression therein for personalizing the grip of the guitar pick and for enhancing the gripability thereof.

Still another object of this invention is to provide a stringed musical instrument pick having a replica of a thumb fingertip impression of a musician on one side and replicas of a forefinger and middle-finger fingertip impression of the musician on the other side for enhancing the gripability of the pick for the musician.

Yet another object of this invention is to provide a pick holder formed from a flexible and highly grippable material, which includes a pocket for engaging a pick, thereby substantially increasing the gripability of the pick.

Still another object of this invention is to provide a pick holder for holding a pick therein, wherein the pick holder includes a plurality of finger tip impressions for enhancing gripability thereof.

And still another object of this invention is to provide a pick holder having personalized fingertip impressions formed therein for use in holding a non impressed pick and increasing gripability thereof.

The objects and advantages set forth herein are achieved by the pick and process of the present invention. The pick of the present invention for a stringed musical instrument includes a first and a second surface. At least one of the first and the second surface has a replica of a fingertip impression for achieving enhanced gripability. A process for forming the stringed musical instrument pick includes the steps of forming the pick having first and second gripping surfaces. At least one of the first and second gripping surfaces has a replica of a fingertip impression therein for enhancing gripability of the pick.

Also in accordance with the objects and advantages of the present invention, a pick holder is disclosed for use in holding a standard pick used for playing a stringed musical instrument is also disclosed. The pick holder includes a first side and a second side connected with and spaced from the first side. A pocket is formed between the first and second sides and includes means for engaging the pick. In one embodiment, at least one of the first surface of the first side and the second surface of the second side includes a replica of a fingertip impression for achieving enhanced pick gripability. In another embodiment, the pick holder is formed from a soft rubber-like material, allowing it to be flexible for engaging the pick while also providing a very grippable surface, without fingertip impressions therein. A process for forming the holder is also disclosed.

The details of the present invention are set out in the following description and drawings wherein like reference characters depict like elements.

DETAILED DESCRIPTION OF THE PREFERRED EMBODIMENT

Figure 1B:
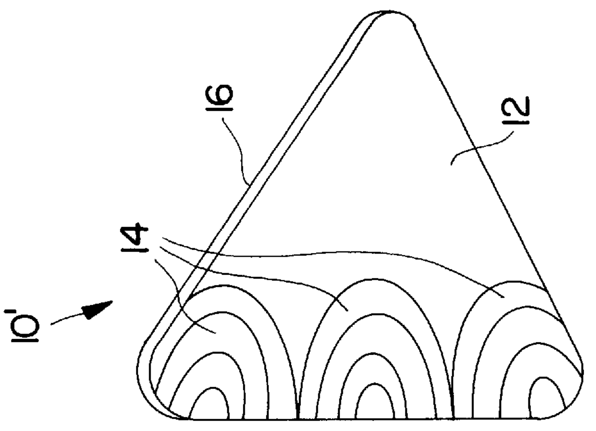
FIG. 1B is an enlarged perspective view of the pick, similar to FIG. 1, showing a different finger impression arrangement.
Figure 1A:
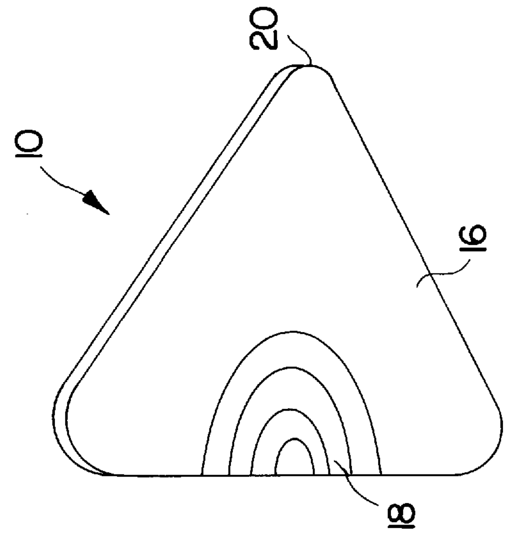
FIG. 1A is a reverse side perspective view of the pick shown in FIG. 1.
Figure 1:
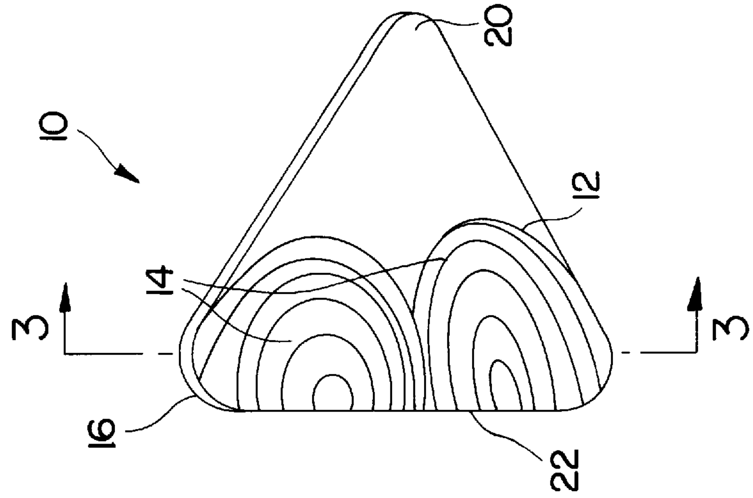
FIG. 1 is an enlarged perspective view of a stringed musical instrument pick in accordance with the principles of the present invention.

Referring now to the drawings in detail there is shown in FIGS. 1 and 1A a perspective view of a stringed musical instrument pick or plectrum in accordance with the principles of the present invention, and is designated generally as 10. Pick 10 generally includes a first surface 12 having an impressed area 14 and a second surface 16 having an impressed area 18 (shown in FIG. 1A only).

The pick 10, as described herein, can be used for playing all types of stringed musical instruments including guitars, harpsichords, banjos, mandolins, etc. The particular pick 10 shown in the drawings is directed toward use with guitars although the invention described herein can be used with picks used for any of the instruments mentioned above. Accordingly, the instant invention is not limited to guitar picks.

Figure 2:
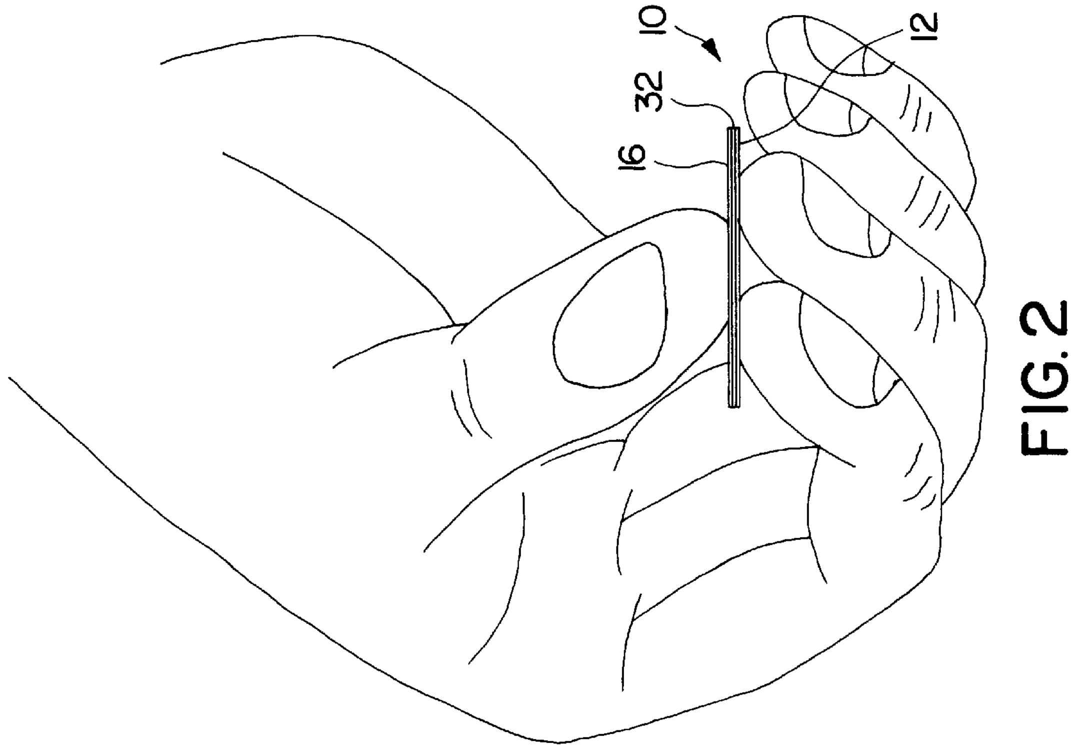
FIG. 2 is a view of a typical grip used for holding a pick and a method for forming fingertip impressions in the surfaces of a pick in accordance with the principles of the present invention.

Stringed musical instrument picks are generally triangularly shaped as shown in the figures, but may have other shapes which are equally effective. Accordingly, the shape of the pick is not critical to the present invention. The primary feature herein, the impressed areas on the pick surfaces, can be used with any shape pick. A pointed area 20 of pick 10 is preferably used for plucking the strings of a musical instrument while pick 10 is held in areas 14 and 18 immediately adjacent edge 22. As shown, for pick 10 of the present invention, areas 14 and 18 are impressed areas, conformed to the pick grasping fingertips of the musician using the pick for playing a stringed musical instrument, as shown in FIG. 2.

Figure 3:
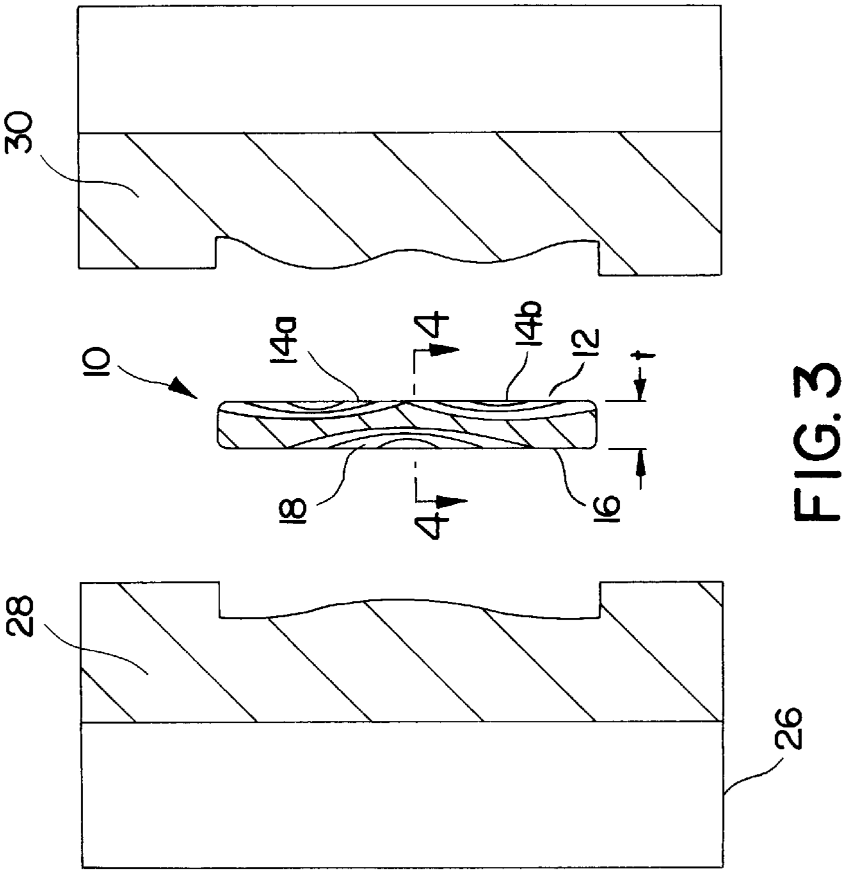
FIG. 3 is a cross-sectional, enlarged end view of the stringed musical instrument pick taken along line 3—3 of FIG. 1 and a device for molding the pick, in accordance with the principles of the present invention.
Figure 4:
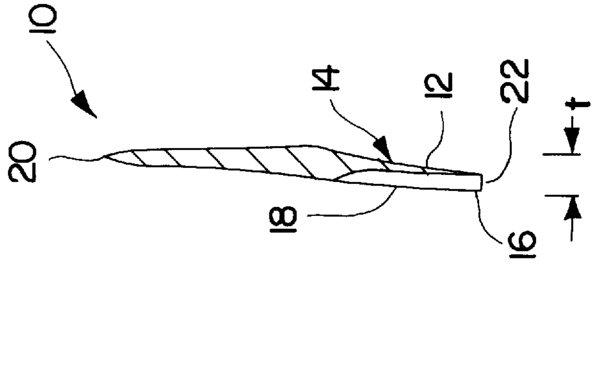
FIG. 4 is an overhead cross-sectional enlarged view of the stringed musical instrument pick shown in FIGS. 1 and 3 taken along line 4—4 of FIG. 3, in accordance with the principles of the present invention.

Referring to FIGS. 3 and 4, impressed areas 14 and 18 are replicas of the fingertip impressions of the musician playing the stringed instrument. With pick 10 having a thickness t, impressed areas 14 and 18 are indented or recessed into thickness t with the impression of the musicians fingertips, slightly inward of edge 22. Typically, a total of at least two and more typically three different fingertip impressions are formed in surfaces 12 and 16 in areas 14 and 18, as indicated in FIG. 3 by area 18 in surface 16 and areas 14_a_ and 14_b_ in surface 12. Most preferably, the fingertip impression replicated on surface 16 at area 18 is the thumb fingertip impression and on surface 12 at areas 14*a* and 14*b*, the forefinger and middle-finger fingertip impressions, respectively, as shown in FIG. 3. This arrangement follows the manner in which the pick is typically held, as indicated in FIG. 2. However, based on the individual needs of the musician, different fingertips and numbers of fingertips can be impressed on surfaces 12 and 16 for forming impressed areas 14 and 18, respectively. For example, some musicians may prefer to hold the pick using the thumb on one side and the forefinger, middle-finger, and neighboring finger on the other side. Impressions in areas 14 and 18 to accommodate this manner of holding the pick are shown in the FIG. 1B embodiment of the pick, designated as pick 10.

The particular type of material used for forming pick 10 with impressed areas 14 and 18 is dependent upon the process used for forming the same.

If a large quantity of picks is desired to be formed for use by a musician over a long period of time, the most efficient manner of forming the pick in accordance with the principles of the present invention would be by molding the same, preferably via molding through molding machine 26, preferably an injection molding machine, shown schematically in FIG. 3. In this instance, mold halves 28 and 30 forming a mold in the shape of pick 10 (shown enlarged) and impressed areas 14 and 18, replicating the shape and texture of the musician's fingertips, can be used. In accordance with this method, the molding material will be injected into the mold for forming the pick. For this pick forming process, the molding material such as that typically used for forming currently known picks can be used for forming the pick in accordance with the principles of this invention or any other materials which suitably become rigid upon cooling can be used. The mold shape may also be altered for varying the thickness or gauge of the picks, as desired by the musician.

Referring again to FIG. 2, another, and the most preferable method for forming pick 10 of the present invention, is indicated. Accordingly, to form impressed areas 14 and 18, pressure is applied to surface 12 and 16 through the musicians fingertips on a malleable pick substrate 32, i.e., a substrate formed in the pick shape and from a material exhibiting formability via such pressure and exhibiting subsequent setting to a rigid state at room or elevated temperatures.

Figure 5:
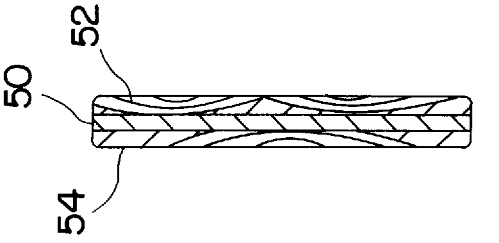
FIG. 5 is a cross-sectional enlarged view of an alternative embodiment of the pick shown in FIG. 3, in accordance with the principles of the present invention.

Alternatively, in accordance with this fingertip pressure application method of forming pick 10 in accordance with the principles of the present invention, and referring to FIG. 5, pick 10 may be formed as a laminate having a central rigid layer 50 having laminated on opposed sides thereof, deformable layers 52 and 54. Accordingly, layers 52 and 54 are formed from a material deformable via the application of fingertip pressure. This material will subsequently set to a rigid state when cured.

The materials discussed below may be used to form substrate 32 and layers 52 and 54. Accordingly, several types of materials may be used for forming pick 10 in accordance with the fingertip pressure application method of formation.

One category of material that may be used for substrate 32 is a composition which may be cured or hardened via the presence or application of moisture, preferably ambient moisture, i.e., moisture-hardening compositions. In accordance with this category, U.S. Pat. No. 5,288,797 is hereby incorporated by reference for use herein, with particular reference to the composition disclosed in column 4, line 6 to column 11, line 17. Another example of a moisture hardening composition that may be used is disclosed in U.S. Pat. No. 5,319,050 and is hereby incorporated by reference in particular with reference therein to column 1, line 48 to column 8, line 9. Another moisture curing or hardening composition which may be used for forming the pick substrate of the present invention, the composition disclosed in U.S. Pat. No. 5,321,054 is hereby incorporated by reference for use herein, with particular reference to column 2, line 34 to column 5, line 23.

Thermal-hardening compositions, wherein the material cures or hardens upon heating, and thermal-softening compositions, wherein the material cures or hardens upon cooling, may also be used for forming the disclosed pick 10 via the method of fingertip pressure application, in accordance with the principles of the present invention. The thermal-softening composition disclosed in U.S. Pat. No. 5,431,563, for example, is hereby incorporated by reference for use herein, with particular reference to column 5, line 4 to column 9, line 33.

An example of a thermal-hardening composition which may be used in this invention is disclosed in U.S. Pat. No. 5,321,054 which is hereby incorporated for use herein, with particular reference to column 2, line 34 to column 5, line 22.

In accordance with these compositions, the method of forming the pick by exerting fingertip pressure on first and second surfaces 12 and 16 for forming impressed areas 14 and 18, respectively, being impressions of the musician's fingertips, preferably the thumb and forefinger and middle-finger combination, respectively, can be performed.

After forming pick 10 via one of the methods described above, i.e., via molding or fingertip pressure application forming, pick 10 is used in the same manner as prior art picks known in the art are used. With the instant invention, however, due to the impression of the musicians fingertip on surfaces 12 and 16 of the pick, enhanced gripability of the pick is achieved allowing for maximum control of the pick during even the most energetic musical performances.

Figure 6A:
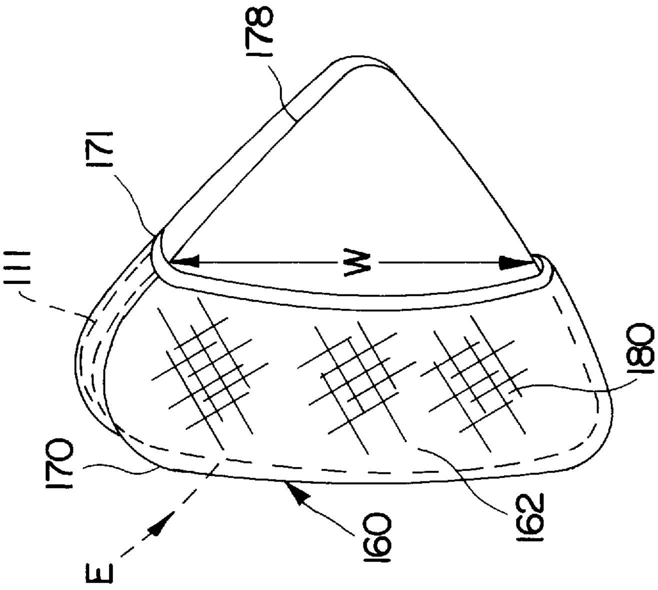
FIG. 6A is a perspective view of the pick holder of FIG. 6 engaged with a pick.
Figure 6:
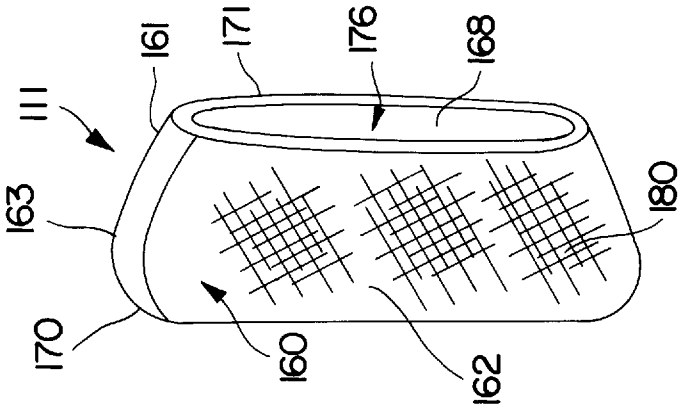
FIG. 6 is a perspective view of an embodiment of a pick holder in accordance with the principles of the present invention.

As an alternative to the pick described in detail above, a pick holder 111, as shown in FIGS. 6 and 6A, also in accordance with the principles of the present invention, is used for holding non impressed picks for increasing the gripability thereof. The pick holder includes sides 160 and 161 having outer surfaces 162 and 163, opposed each other. Sides 160 and 161 are separated by a space 168 but connected at a widest end 170. Preferably, sides 160 and 161 are tapered inwardly from end 170 forming a narrowest end 171. Space 168, in combination with end 170 and inner surfaces 172 and 174 of sides 160 and 161, respectively, forms a pocket 176 for receiving a pick 178 in a manner for firmly holding the same. The pocket, at widest end 170, is of a width to fit, preferably snugly, the widest end E of standard pick 178. The pocket, at narrowest end 171, is of a width to fit, preferably snugly, the width W the portion of the standard pick aligned with end 171, while end E of pick 178 is against the inner surface of end 170 of pick holder 111. Pick holder 111, therefore, preferably has a trapezoidal-type shape, as shown in FIG. 6, with two substantially parallel edges and two converging angled edges connecting the parallel edges. Accordingly, pick holder 111 is preferably formed from a rubber-like material, such as rubber or like forms of plastic, which is flexible for stretching over the standard pick and resilient for returning to its original shape, while also providing a non-slip surface for increased gripability. That is, in order for end E of pick 178 to fit through end 171, end 171 is stretchable, due to the material selected and preferred, to a width for receiving end E. End 171 of pick holder 111 then returns to substantially its original trapezoidal shape. Due to the non-slip nature of this material, substantially increased gripability of the pick is desirably achieved. In order to further enhance gripability, surfaces 162 and 163 may be abraded or otherwise textured as shown in FIGS. 6 and 6A by texture 180. Such materials for use as described for holder 111 are known and accordingly, are not further described.

Figure 7:
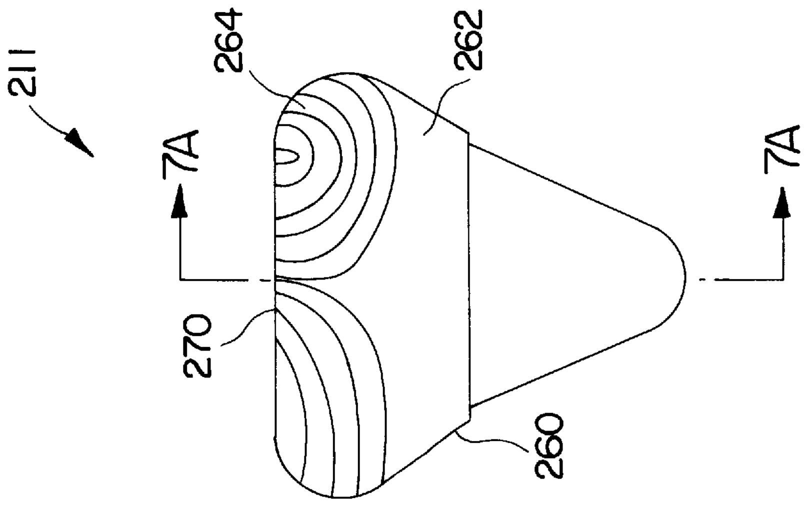
FIG. 7 is a plan view of another embodiment of the present invention in the form of a pick holder for holding a nom-impressed pick, wherein the pick holder includes finger tip impressions.

As another embodiment of the pick holder described above, a pick holder 211, as shown in FIGS. 7, 7A, and 7B, also in accordance with the principles of the present invention, is used for holding non impressed picks for increasing the gripability thereof. Similar to the picks discussed above, the pick holder includes sides 260 and 261 having outer surfaces 262 and 263, opposed each other, and which each include fingertip impressions 264, respectively. However, for pick holder 211, sides 260 and 261 are separated by a space 268 but connected at end 270. Space 268, in combination with end 270 and inner surfaces 272 and 274 of sides 260 and 261, respectively, forms a pocket 276 for receiving a pick 278 in a manner for firmly holding the same. Accordingly, inner surfaces 272 and 274 have an adhesive or other tacky substance 280 thereon. Alternatively, and as shown for example in the more enlarged view of FIG. 7B, inner surfaces 272 and 274 may be tapered inwardly toward end 270 so as to provide a portion 282 of space 268 with an interference fit in relation to the thickness "t" of pick 278, for engaging the same.

Figure 7A:
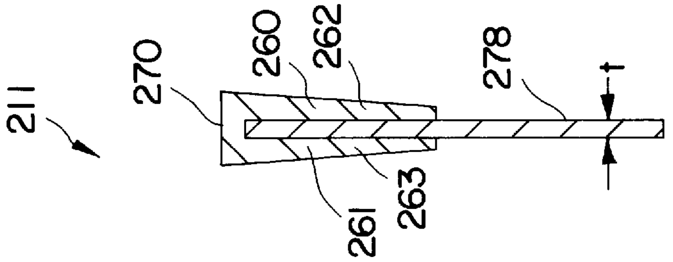
FIG. 7A is a cross-sectional of the pick holder view taken along line 7A—7A of FIG. 7, with a pick in the holder.
Figure 7B:
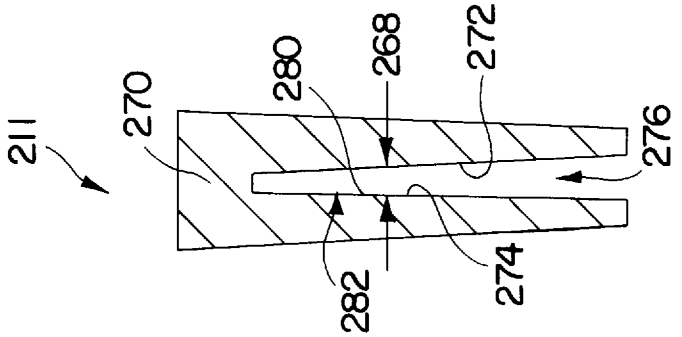
FIG. 7B is an enlarged cross-sectional view of the pick holder of FIG. 7, without a pick therein.

Sides 260 and 261, as shown in FIG. 7A for side 260, preferably exhibit a shape very similar to that of a base portion of a standard pick, such as pick 278. However, the sides of holder 211 to not fully extend to a tip as with standard pick 278, preferably extending about one-half the length of a standard pick or at least the length for forming pocket 276, as shown in FIG. 7B, of a size sufficient for allowing a stable hold on standard pick 278 while also providing sufficient space for the formation thereon of the fingertip impressions.

As indicated above, surfaces 262 and 263 of holder 211 have the fingertip impressions as described in detail above with respect to pick 10. Accordingly, the various arrangements of the fingertip impressions in pick 10 are hereby incorporated for holder 211, and are not further described. Also, the various materials and methods for forming pick 10 and its fingertip impressions, based on these various materials used, are also hereby incorporated for holder 211 for forming it with the various fingertip impression arrangements.

In using holder 211, a standard pick 278 is simply inserted into pocket 276 and held in place by at least one of adhesive on inner surfaces 272 and 274 and the tapered pocket having an interference fit with the pick, as described above. In each case the standard pick is firmly held in the holder and increased gripability thereof is provided by the fingertip impressions formed therein.

The primary advantage of the invention is that a stringed musical instrument pick is provided having formed therein a replica of a musician's fingertip impression. Another advantage of this invention is that a stringed musical instrument pick formed from a material which is conformable at room temperature or at an elevated temperature is provided so that replicas of fingertip impressions can be formed thereon via the application of fingertip pressure for enhancing the gripability of the pick. And still another advantage of this invention is that a guitar pick is provided having two sides with surfaces and each surface having at least one replica of a musician's fingertip impression therein for personalizing the grip of the guitar pick and enhancing the gripability thereof. Still another advantage of this invention is that a stringed musical instrument pick is provided having a replica of a thumb fingertip impression of a musician on one side and replicas of a forefinger and middle-finger fingertip impression of the same musician on the other side of a musician for enhancing the gripability of the pick. Yet another advantage of this invention is that a pick holder is provided which is formed from a flexible and highly grippable material, which includes a pocket for engaging a pick, thereby substantially increasing the gripability of the pick. Still another advantage of this invention is that a pick holder is provided for holding a pick therein, wherein the pick holder includes a plurality of finger tip impressions for enhancing gripability thereof. And still another advantage of this invention is that a pick holder having personalized fingertip impressions formed therein is provided for use in holding a non impressed pick and increasing gripability thereof.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A pick for a stringed musical instrument, comprising a substantially flat pick having opposed sides with first and a second opposed surface, wherein at least one of said first and said second surface has an impressed area therein which is a relief image of a fingertip impression having a plurality of semi-circular ridges wherein the ridges replicate the ridges of a fingertip, for achieving enhanced pick gripability.

2. The pick according to claim 1, wherein said first surface has a first impressed area which is a first relief image of a fingertip impression having a plurality of semi-circular ridges wherein the ridges replicate the ridges of a fingertip, and said second surface has at least a second impressed area which is a second relief image of a fingertip impression having a plurality of semi-circular ridges wherein the ridges replicate the ridges of a fingertip, and wherein said first and second relief images represent relief images of different fingers.

3. The pick according to claim 2, wherein said first relief image is a relief image of a thumb fingertip impression and said second relief image is a relief image of at least one other fingertip impression.

4. The pick according to claim 3, wherein said second relief image of at least one other fingertip impression is a relief image of a forefinger fingertip impression.

5. The pick according to claim 3, wherein said second relief image is a relief image of a forefinger fingertip impression and a middle-finger fingertip impression.

6. The pick according to claim 1, wherein said pick is formed from a material which is malleable when heated.

7. The pick according to claim 1, wherein said pick is formed from a material selected from the group consisting of a thermal hardening material, a thermal softening material, and a moisture hardening material.

8. The pick according to claim 1, wherein said pick is formed from a material which is malleable at substantially room temperature and which sets through heating.

9. The pick according to claim 1, in the form of a laminate including a first layer including said first surface and a second layer including said second surface, wherein said relief image is formed in at least one of said first and second layers.

10. The pick according to claim 9, wherein said first and second layers are formed from a material which is malleable when heated.

11. The pick according to claim 9, wherein said first and second layers are formed from a material selected from the group consisting of a thermal hardening material, a thermal softening material, and a moisture hardening material.

12. The pick according to claim 9, wherein said first and second layers are formed from a material which is malleable at substantially room temperature and which sets through heating.

13. The pick according to claim 9, further including a central layer, said first and second layers being attached to opposite sides of said central layer.

14. The pick according to claim 13, wherein said central layer is a substantially non deformable substrate.

15. The pick according to claim 1, wherein said impressed area is formed by fingertip pressure.

16. The pick according to claim 1, wherein said impressed area extends to an edge of said pick.

17. A process for producing a stringed musical instrument pick, comprising the steps of:

forming substantially flat pick having opposed sides with first and second opposed gripping surfaces of said pick and forming an impressed area therein which is a relief image of a fingertip impression having a plurality of semi-circular ridges wherein the ridges replicate the ridges of a fingertip, on at least one of said first and second gripping surfaces for enhancing gripability of said pick.

18. The process according to claim 17, wherein said steps of forming comprises the step of molding.

19. The process according to claim 18, wherein said step of molding is performed via injection molding.

20. The process according to claim 17, wherein said steps of forming include forming at least two relief images of fingertip impressions on said first of said surfaces and forming at least one relief image of a fingertip impression on said second of said surfaces.

21. The process according to claim 17, wherein said steps of forming include forming a relief image of a forefinger fingertip impression and a middle-finger fingertip impression on said first of said surfaces and forming a relief image of a thumb fingertip impression on said second of said surfaces.

22. The process according to claim 21, further including the step of performing the steps of forming by the step of injection molding.

23. The process according to claim 17, including the step of forming an impressed area applying fingertip pressure.

24. The process according to claim 17, including the step of forming said impressed area so that said impressed area extends to an edge of said pick.

25. A process for producing a stringed musical instrument pick, comprising the steps of:

providing a pick substrate formed from a material which is conformable by the application of pressure; forming first and second gripping surfaces on said pick substrate for enhancing gripability of said pick; said forming including applying fingertip pressure to said substrate.

26. The process according to claim 25, including the step of heating said substrate and causing said substrate to become malleable under said fingertip pressure.

27. The process according to claim 25, further including the step of applying said fingertip pressure to said substrate at substantially room temperature and heating said substrate for setting said substrate to a rigid state for forming said pick.

* * * * *